(12) United States Patent
Catrinta

(10) Patent No.: US 6,974,013 B1
(45) Date of Patent: Dec. 13, 2005

(54) CLUTCH ADJUSTER

(76) Inventor: John Catrinta, 5130 N. Kildare, Chicago, IL (US) 60630

(*) Notice: Subject to any disclaimer, the term of this patent is extended or adjusted under 35 U.S.C. 154(b) by 37 days.

(21) Appl. No.: 10/881,386

(22) Filed: Jun. 30, 2004

(51) Int. Cl.⁷ .............................................. F16D 13/75
(52) U.S. Cl. ................ 192/111 B; 192/70.25; 192/114 R
(58) Field of Search .................. 192/111 R, 111 B

(56) References Cited

U.S. PATENT DOCUMENTS

| | | |
|---|---|---|
| 1,016,427 A | 2/1912 | Morse |
| 1,063,998 A | 6/1913 | Morse |
| 1,571,015 A | 1/1926 | Leighton |
| 1,782,880 A | 11/1930 | Pearmain |
| 1,963,364 A | 6/1934 | Hazelton et al. |
| 2,057,802 A | 10/1936 | Tatter |
| 2,086,954 A | 7/1937 | Fawick |
| 2,095,816 A | 10/1937 | Johansen |
| 2,207,051 A | 7/1940 | Colman |
| 2,280,355 A | 4/1942 | Spase et al. |
| 2,395,308 A | 2/1946 | Wemp |
| 2,409,013 A | 10/1946 | Bodmer |
| 2,758,691 A | 8/1956 | Palm |
| 2,874,816 A | 2/1959 | Dehn |
| 3,176,814 A | 4/1965 | Sink |
| 3,752,286 A | 8/1973 | Sink |
| 3,754,628 A | 8/1973 | Hildebrand |
| 4,086,995 A | 5/1978 | Spokas |
| 4,285,424 A | 8/1981 | Sink et al. |
| 4,953,680 A | 9/1990 | Flotow et al. |
| 5,526,913 A * | 6/1996 | Tarlton et al. ........... 192/70.25 |

* cited by examiner

*Primary Examiner*—Richard M. Lorence
(74) *Attorney, Agent, or Firm*—Cook, Alex, McFarron, Manzo, Cummings & Mehler Ltd

(57) ABSTRACT

An adjusting mechanism to compensate for clutch disc wear is located in the lever linkage of the clutch, fixed to the cover. Rotational movement axially moves an adjusting ring, thus performing the adjustment. In a first embodiment, the locking member is pushed down to release the bolt head for the adjusting mechanism to allow it to be rotated. In a second embodiment, the locking member is pushed down to release the locking member, which also engages the bolt head for the adjusting mechanism, to permit rotation of the locking member and, consequently, adjustment of the clutch. In a third embodiment, the locking member is attached by means of a fastener to the bolt head and is removed to permit adjustment.

19 Claims, 3 Drawing Sheets

CLUTCH ADJUSTER

BACKGROUND OF THE INVENTION

The present invention relates to a mechanism for adjusting spring-loaded friction clutches of large automotive vehicles. In particular, this invention relates to a clutch adjuster that secures or locks-in the adjustment and prevents rotational movement between the adjusting ring and the gear of the clutch adjuster.

Most clutches used in heavy trucks contain some type of clutch adjuster in which a manually-operated rotary gear meshes with the internal teeth of the adjusting ring to accomplish the adjustment. The rotating gear typically includes a central bolt terminating in a hex-head that is engaged by a socket wrench for rotating the gear. The clutch adjuster is locked in position by a strap that prevents rotation of the head associated with the gear. The locking and unlocking of the clutch adjuster is done by moving or removing the lock strap, which requires of manipulation of the hold-down screws that secure the strap to the clutch housing. The hold-down screws are often difficult to access, thus complicating adjustment of the clutch with this type of clutch adjuster.

This drawback was addressed by the clutch adjusters shown in Flowtow et al. U.S. Pat. No. 4,953,680. The Flowtow et al. clutch adjusters are designed to unlock by pressing the center bolt down at a reasonable force (e.g., 15 lbs.). Specifically, axial movement of the center bolt is necessary to perform the locking and unlocking of the clutch adjuster. Due to the dirty environment and the size of the ring to be rotated, the teeth of the adjusting ring and clutch adjuster can become frozen or locked. This increases substantially the force needed to axially move the center bolt to unlock the adjuster, and may make it practically impossible. Further, in the commercial version (shown in FIG. 5), the locking is "blind," i.e., the locking surfaces are obscured from view. This leads to uncertainty as to whether locking has, in fact, occurred. If the Flowtow et al. clutch adjuster is not, in fact, locked into position, upon the first engagement of the clutch, the central bolt will rotate, and damage the locking strap. This results in gross mis-adjustment of the clutch, and the requires that the clutch adjuster be replaced.

Therefore, it is an object of the present invention to provide a clutch adjuster in which manipulation of a lock strap and mounting screws is not required.

It is a further object to provide such a clutch adjuster that provides a visual indication that the adjuster is locked into position, thus offering safety and certainty in operation.

SUMMARY OF THE INVENTION

In accordance with the present invention a clutch adjuster is provided that does not include a removable strap for locking and adjustment operation. The clutch adjuster includes a bracket having a central depressed area between two arms. In a first embodiment, a locking member is provided that is placed under the head of the adjusting bolt in the central area of the bracket. The locking member is biased upwardly into engagement with the head of the adjusting bolt by, e.g., a waved or spring washer. While a spring washer is shown in the illustrated embodiment, other biasing or resilient means may be used interchangeably, such as a spring, a compressible rubber washer, etc. The locking member is pushed down with a socket wrench, releasing the head of the bolt, and allowing the bolt to be freely rotated by the socket wrench. Upon removal of the socket wrench, the lock is returned to its initial position by the force of the spring, which thus engages and locks the head of the bolt. The relative position between the head of the bolt and the locking member is visible, thus allowing corrective rotation of the bolt, if necessary, to assure the locking. Rotation of the locking member, and thus the central bolt when engaged by the locking member, is prevented by the arms of the bracket.

In a second embodiment, a locking and adjusting member is provided that is in axial alignment with the bolt and is moveable between adjusting and locking positions. The locking and adjusting member includes a socket shaped to engage the head of the bolt, a head adapted to be engaged by a tool, and opposed shoulders beneath the head. The arms of the bracket further comprise locking arms that extend at least partially over the central area and are adapted to engage the opposed shoulders on the locking and adjusting member when in the locking position. The locking and adjusting member is biased toward the locking position by a resilient member, such as a spring.

In a third embodiment of the invention, the locking member overlies the head of the bolt and is removeably attached to the center bolt by a screw to permit adjustment.

DETAILED DESCRIPTION OF THE PREFERRED EMBODIMENTS

Figure 1:
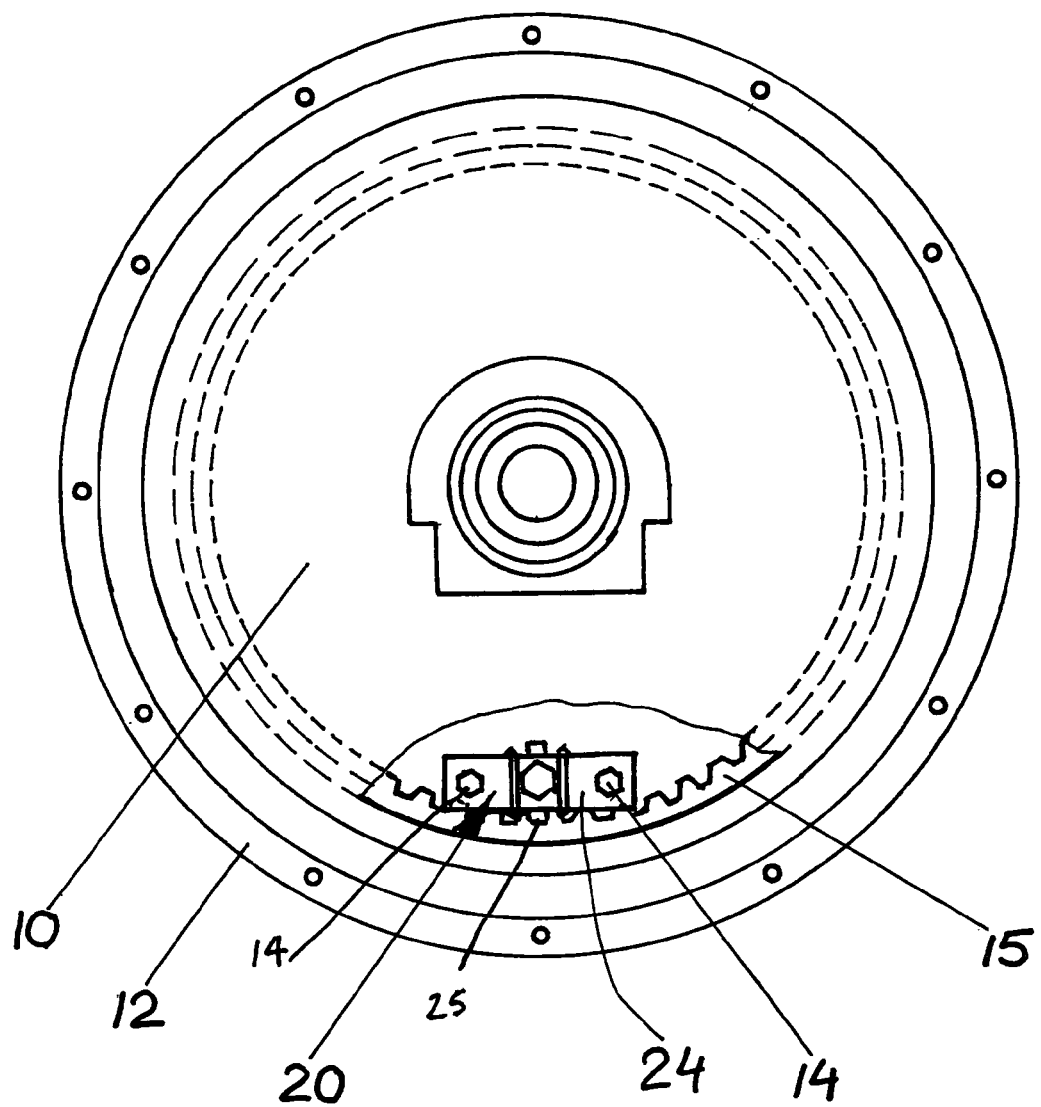
FIG. 1 is a plan view, with portions broken away to show detail, of a clutch which incorporates clutch adjuster according to the present invention.
Figure 2:
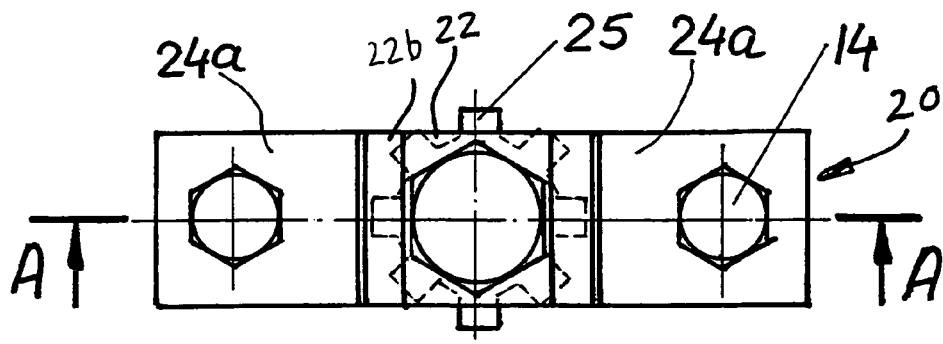
FIG. 2 is an enlarged plan view of the clutch adjuster according to a first embodiment of the present invention.
Figure 3:
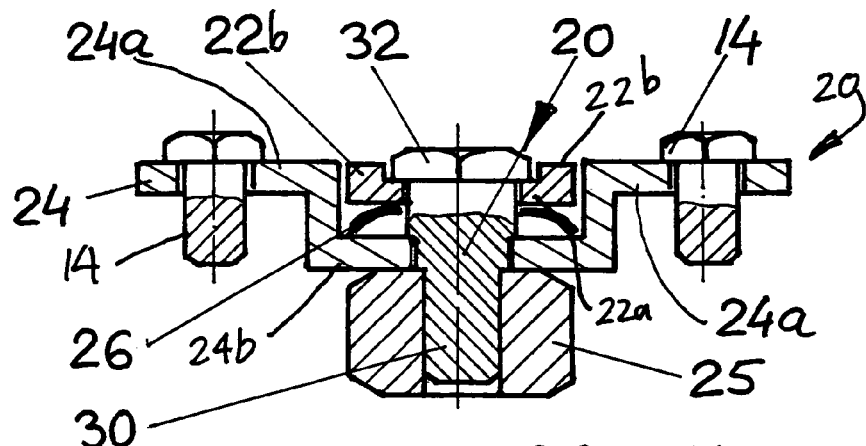
FIG. 3 is a cross-sectional view taken along line A—A of FIG. 2.

Referring to FIG. 1, there is schematically illustrated a conventional friction clutch 10 which incorporates a first preferred embodiment of a clutch adjuster 20. Turning to FIGS. 2 and 3, the adjuster 20 includes a strap or bracket 24 with two generally L-shaped arms 24a that flank a central depressed area 24b. The central area 24b includes an aperture that captures the central bolt 30 which carries a rotary gear or sprocket 25. The teeth of the sprocket 25 are configured to engage the teeth of a clutch adjusting ring 15. The adjuster 20 is secured to the clutch cover 12 by two bolts 14.

With reference to FIGS. 2 and 3, the adjuster 20 includes a central bolt 30 which has a head 32 (preferably hex- or square-shaped) adapted to be engaged by a torque-applying tool, such as a socket wrench. The shaft of the bolt 30 is captured for rotation in an aperture in the central area 24b of the bracket 24. As illustrated, the shaft of the bolt 30 has different diameters for proper assembly with the remainder of the components. Specifically, the portion of the shaft immediately beneath the head 32 is enlarged with respect to the remainder of the shaft so as to not be capable of passing through the aperture in the bracket 24. The rotary gear 25 is secured to the lower portion of the shaft 30 so as to substantially prevent axial movement of the bolt 30 with respect to the bracket 24.

A locking member 22 is mounted to the enlarged portion of the shaft of the bolt 30 immediately under the head 32 of the central bolt 30. The locking member 22 is configured with a recessed portion 22a between two opposed raised portions 22b (best seen in FIG. 3), which are adapted to engage two sides of the head 32 of the bolt 30 when in the locking position. The locking member 22 seats in the central portion 24b of the bracket 24 between the two L-shaped arms 24a so that rotation of the locking member 22 with respect to the bracket 24 is prevented. As illustrated, a spring washer 26 is positioned between the locking member 22 and the bracket 24 to bias the lock in a upward direction, thus engaging the shaped head of the bolt, which would otherwise rotate freely. As noted above, other resilient means may be substituted for the spring washer. The spring 26 should have a resiliency such that the force required to move the locking member 22 out of engagement with the head 32 of the bolt 30 is approximately 8 pounds. This force remains constant regardless of the condition of the clutch components. Consequently, by using a socket wrench, locking member 22 can be pushed down against the force of the spring washer 26, and the shaped head 32 will be free to rotate along with sprocket 25 upon rotation of the wrench, thus making the clutch adjustment possible. By removing the socket wrench, the spring washer 26 biases the locking member 22 upwardly to capture and lock the head. Since whether locking engagement has occurred can be easily visually confirmed, damage to the clutch or accidents due to the clutch adjuster not being properly locked can be avoided. For better visibility, the locking member 22 and the bracket 24 can be of contrasting colors.

Figure 4:
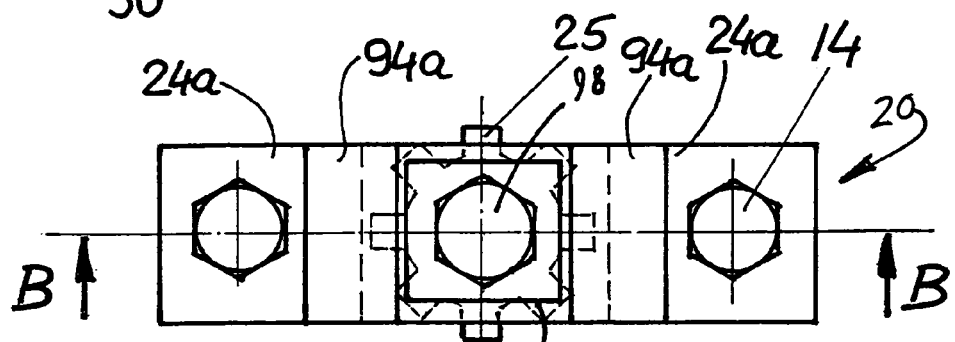
FIG. 4 is an enlarged, plan view of a second embodiment of the clutch adjuster according to the present invention.
Figure 5:
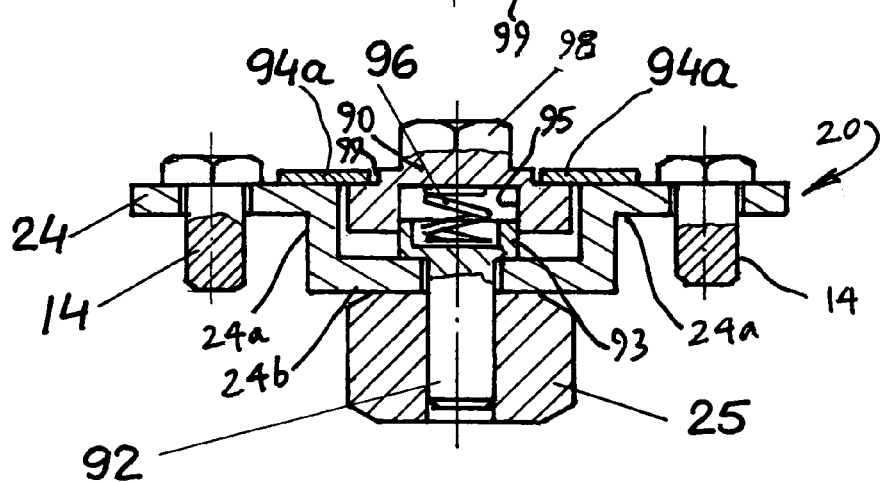
FIG. 5 is a cross-sectional view taken along line B—B of FIG. 4.

Turning to FIGS. 4 and 5, a second embodiment of a clutch adjuster according to the present invention is shown. Like the clutch adjuster of FIGS. 2 and 3, the clutch adjuster 20 includes a bracket 24 with two L-shaped arms 24a bounding a central depressed region 24b. Two bolts 14 secure the bracket 24 to the cover 12. The central area 24b includes an aperture that captures the central bolt 92 that carries the rotary gear 25, the teeth of the gear 25 being configured to engage the clutch adjusting ring 15. As can be seen from FIG. 5, the spacing between the head 93 of the bolt 92 and the rotary gear 25 is such that substantially no axial movement of the bolt 92 is permitted with respect to the bracket 24.

In keeping with this embodiment of the invention, a locking and adjusting member 90 is provided that overlies the head 93 of the bolt 92 and is moveable axially with respect to the bolt between a locking position (shown in FIG. 5) and an adjusting position. The locking and adjusting member 90 includes a socket 95 shaped to engage the head 93 of the bolt 92 and a head 98, preferably hex-shaped, adapted to be engaged by a wrench for rotating the member 90 and, consequently, the bolt 92. The socket 95 is preferably in engagement with the head 93 of the bolt 92 throughout its range of axial movement. The locking and adjusting member 90 includes a shoulder 99 between its head 98 and socket 95 that is shaped to be engaged by opposed locking arms 94a that are attached (by e.g., welding) to bracket arms 24a and extend partially across the central depressed area 24b of the bracket. As illustrated, the shoulder 99 has a square shape (when viewed from above as in FIG. 4) thus presenting four facets, but may be of other polygonal shapes (e.g. hexagonal or octagonal) as long as the facets of the shoulder present a sufficient contact area with respect to the edges of the locking arms 94a to prevent the shoulder from being stripped when a torque is applied to the locking and adjusting member 90 in the locking position. A spring 96 is provided to bias the locking and adjusting member 90 toward the locked position. As illustrated, the spring 96 is positioned between the head of the bolt 92 and the top wall of the socket 95, with the spring 96 seated in a recess in the head 93 of the bolt 90. Alternatively, the spring 94 can be seated around the head 93 of the bolt 92 between the central area 24b of the bracket 24 and the bottom side of the locking and adjusting member 90.

Consequently, if a clutch to which the clutch adjuster of FIGS. 4 and 5 is attached requires adjustment, a socket wrench is used to engage the head 98 of the locking and adjusting member 90. The wrench is pushed down against the force of the spring 96 to move the locking and adjusting member 90 toward the head 93 of the bolt 92 until the shoulder 99 is located below the lower edges of the locking arms 94a. In this position, a member 90 will be free to rotate upon rotation of the wrench, thus making clutch adjustment possible. When proper adjustment is achieved, and the adjusting member 90 is oriented so that the opposed edges of the shoulders 99 are aligned with the edges of the locking arms 94a. Thus, when the locking member 90 is biased upwardly by the force of the spring 96, the shoulders 99 are aligned with and engaged by the locking arms 94a to prevent rotation of the locking member, which, in turn, prevents rotation of the bolt 92.

Figure 6:
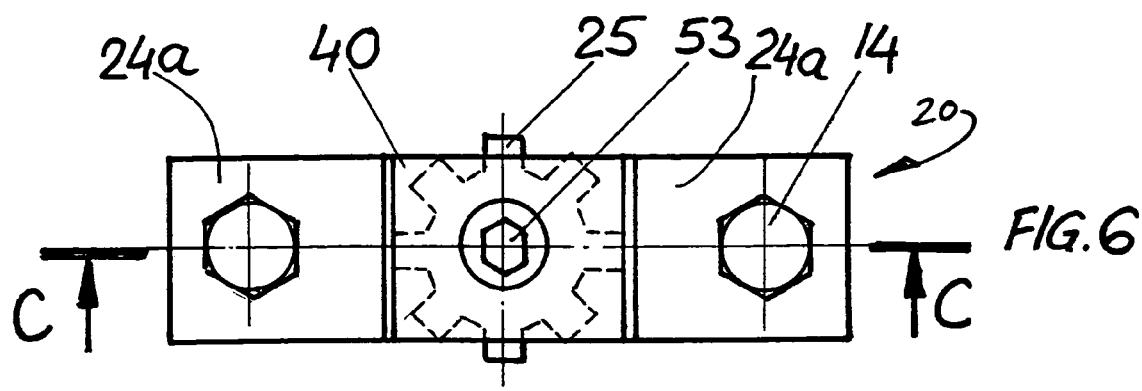
FIG. 6 is an enlarged plan view of a third embodiment of the clutch adjuster of the according to the present invention.
Figure 7:
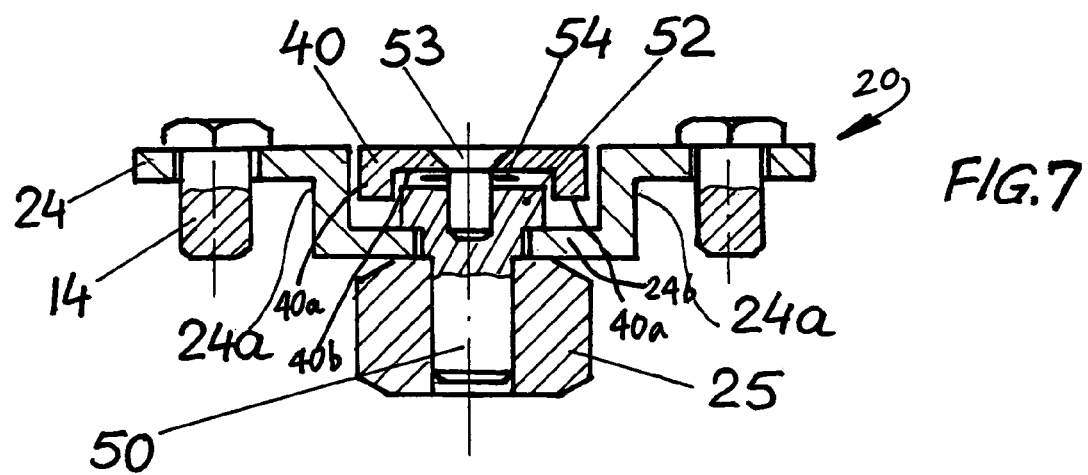
FIG. 7 is a cross-sectional view taken along line C—C of FIG. 6.

Turning to FIGS. 6 and 7, a third embodiment of the clutch adjuster 20 is shown which incorporates a removable locking member 40. Like locking member 22, locking member 40 has a central recessed portion 40b between two opposed raised portions 40a which are configured to engage two sides of the shaped head 52 of the center bolt 50 when in its locking position. However, instead of being placed under the head 52, the locking member 40 is placed over the shaped head 52 of the center bolt 50, and is secured in the locking position to the head of the bolt 50 by a threaded fastener, such as screw 53. A retaining washer 54 is secured to the shaft of the screw 53 between the lock 40 and the head 52. Thus, the retaining washer 54 maintains the locking member 40 on the screw 53, while permitting the locking member 40 to rotate with respect to the screw 53. The center bolt 50 is secured to the sprocket 25. When in the locking position, the center bolt shaped head 52 and the locking member 40 resides substantially in the central portion of strap 24 between the two L-shaped arms 24a, thus preventing both the lock and the center bolt from rotating. By removing the lock assembly (locking member 40, screw 53, retaining washer 54), access to the center bolt is gained and adjustment of the clutch can be achieved. The clutch adjustment can be performed with a socket wrench, as set forth above. When the lock assembly is reattached, a visual check can be made to insure that locking has been accomplished.

As can be appreciated, in none of the embodiments is there any axial movement of the sprocket 25 or center bolt 30. This insures more reliable operation of the clutch adjuster.

Those skilled in the art will appreciate that there are slight variations which will work equally as well as the one presented. Although the invention has been described in terms of certain preferred embodiments, the invention is not to be limited to the same. Instead the invention is to be defined by the scope of the following claims.

What is claimed is:

1. A clutch adjuster for a clutch having a housing and a toothed adjusting ring, the clutch adjuster comprising:

a bracket having a central depressed area between two arms, the bracket adapted to be secured to the clutch housing;

a bolt having a head adapted to be engaged by a tool and a shaft captured by an aperture in the central depressed area of the bracket;

a rotary gear having teeth adapted to mesh with the teeth of the adjusting ring carried on the shaft of the bolt; and a locking member for selective locking engagement with the head of the bolt to prevent rotation of the bolt, the locking member lying in a plane substantially at or below a plane defined by the arms of the bracket when in locking engagement with the head of the bolt so that the arms of the bracket substantially prevent rotation of the locking member.

2. The clutch adjuster of claim 1 wherein the locking member is captured on the shaft of the bolt between the head of the bolt and the bracket, the locking member being biased towards engagement with the head of the bolt.

3. The clutch adjuster of claim 2 wherein the locking member is biased toward engagement with the head of the bolt by one of a conical spring, rubber washer, and a spring washer.

4. The clutch adjuster of claim 1 wherein the locking member is removably secured to the head of the bolt by a threaded fastener.

5. The clutch adjuster of claim 4 wherein the locking member is rotatably secured to the threaded fastener.

6. The clutch adjuster of claim 1 wherein the bolt and the rotary gear secured thereto are configured to prevent axial movement of the bolt with respect to the bracket.

7. The clutch adjuster of claim 2 wherein the portion of the shaft of the bolt that captures the locking member is enlarged with respect to the aperture in the bracket.

8. The clutch adjuster of claim 1 wherein the locking member and the bracket are of visually-contrasting colors.

9. A clutch adjuster for a clutch having a housing and a toothed adjusting ring, the clutch adjuster comprising:

a bracket having a central depressed area between two arms, the bracket adapted to be secured to the clutch housing;

a bolt having a head adapted to be engaged by a tool and a shaft captured by an aperture in the central depressed area of the bracket;

a rotary gear having teeth adapted to mesh with the teeth of the adjusting ring carried on the shaft of the bolt; and a locking member captured on the shaft of the bolt between the head of the bolt and the bracket for selective locking engagement with the head of the bolt to prevent rotation of the bolt, the locking member lying in a plane substantially at or below a plane defined by the arms of the bracket when in locking engagement with the head of the bolt so that the arms of the bracket substantially prevent rotation of the locking member.

10. The clutch adjuster of claim 9 further comprising a resilient member to bias the locking member towards engagement with the head of the bolt.

11. The clutch adjuster of claim 10 wherein the resilient member is one of a conical spring, rubber washer, and a spring washer.

12. The clutch adjuster of claim 9 wherein the bolt and the rotary gear secured thereto are configured to prevent axial movement of the bolt with respect to the bracket.

13. The clutch adjuster of claim 9 wherein the portion of the shaft of the bolt that captures the locking member is enlarged with respect to the aperture in the bracket.

14. A clutch adjuster for a clutch having a housing and a toothed adjusting ring, the clutch adjuster comprising:

a bracket having a central depressed area between two arms defining an aperture, the bracket adapted to be secured to the clutch housing;

a bolt having a head adapted to be both engaged by a tool and receive a threaded fastener and a shaft captured by the aperture in the central depressed area of the bracket;

a rotary gear having teeth adapted to mesh with the teeth of the adjusting ring carried on the shaft of the bolt; a locking member for selective locking engagement with the head of the bolt to prevent rotation of the bolt, the locking member lying in a plane substantially at or below a plane defined by the arms of the bracket when in locking engagement with the head of the bolt so that the arms of the bracket substantially prevent rotation of the locking member; and a threaded fastener to removably secure the locking member to the head of the bolt.

15. The clutch adjuster of claim 14 wherein the locking member is rotatably secured to the threaded fastener.

16. The clutch adjuster of claim 14 wherein the bolt and the rotary gear secured thereto are configured to prevent axial movement of the bolt with respect to the bracket.

17. A clutch adjuster for a clutch having a housing and a toothed adjusting ring, the clutch adjuster comprising:

a bracket with a central depressed area between two arms defining an aperture, the bracket adapted to be secured to the clutch housing;

a bolt with a head and a shaft, the shaft captured by an aperture in the central depressed area of the bracket;

a rotary gear having teeth adapted to mesh with teeth on the adjusting ring carried on the shaft of the bolt;

a locking and adjusting member in axial alignment with bolt and moveable between adjusting and locking positions, the locking and adjusting member having a socket shaped to engage the head of the bolt, a head adapted- to be engaged by a tool, and opposed shoulders beneath the head; and the arms of the bracket further comprising locking arms extending at least partially over the central area adapted to engage the opposed shoulders of the locking and adjusting member when in the locked position, the locking and adjusting member being biased toward the locking position.

18. The clutch adjuster of claim 17 further comprising a resilient member for biasing the locking and adjusting member toward the locking position.

19. The clutch adjuster of claim 17 wherein the resilient member comprises a spring captured in a recessed in the head of the bolt and in the socket of the locking and adjusting member.

* * * * *